United States Patent
Timmons, Jr.

(10) Patent No.: US 6,742,747 B1
(45) Date of Patent: Jun. 1, 2004

(54) AUGER AID HOLDING STAND

(76) Inventor: Daniel Milton Timmons, Jr., 117 N. Texas St., Graford, TX (US) 76449

(*) Notice: Subject to any disclaimer, the term of this patent is extended or adjusted under 35 U.S.C. 154(b) by 0 days.

(21) Appl. No.: 09/711,731

(22) Filed: Nov. 13, 2000

Related U.S. Application Data

(60) Provisional application No. 60/164,758, filed on Nov. 12, 1999.

(51) Int. Cl.[7] .................................................. A47F 5/12
(52) U.S. Cl. ........................................ 248/139; 248/525
(58) Field of Search ............................... 248/519, 523, 248/525, 532, 546, 547, 514, 516, 518, 676, 671, 646, 651, 176.1, 177.1, 180.1, 188.2, 188.7, 133, 135, 544, 346.06, 346.05, 309.1; 173/26, 28, 185, 152; 175/84, 61; 366/314, 319; 280/419, 687, 462, 481

(56) References Cited

U.S. PATENT DOCUMENTS

| | | | | |
|---|---|---|---|---|
| 647,203 A | * | 4/1900 | Simonds ..................... 248/135 |
| 2,896,293 A | * | 7/1959 | Love ........................... 248/523 |
| 4,515,195 A | * | 5/1985 | Gladstein ................ 248/172 X |
| 4,998,698 A | * | 3/1991 | Martinson ................ 248/176.1 |
| 5,014,961 A | * | 5/1991 | Ferguson ................. 248/676 X |
| 5,090,486 A | * | 2/1992 | Jones ........................... 173/26 |
| 5,117,854 A | * | 6/1992 | Eve .............................. 137/15 |
| 5,507,354 A | * | 4/1996 | Harleman ................... 175/162 |
| 5,586,743 A | * | 12/1996 | Sodolak ....................... 248/671 |
| 5,655,610 A | * | 8/1997 | Skinner ........................ 175/84 |
| 5,673,893 A | * | 10/1997 | Klein ........................... 248/525 |
| 5,772,163 A | * | 6/1998 | Young .......................... 248/139 |
| 5,836,402 A | * | 11/1998 | Jones ........................... 173/185 |
| 5,934,627 A | * | 8/1999 | Lewis et al. ................. 248/148 |
| 6,082,157 A | * | 7/2000 | Boyce ........................... 70/58 |
| 6,106,211 A | * | 8/2000 | Westwood ................... 414/332 |
| 6,216,414 B1 | * | 4/2001 | Feldberg ................. 248/525 X |
| 6,533,227 B1 | * | 3/2003 | Rom ............................ 248/148 |

FOREIGN PATENT DOCUMENTS

JP          2001-173356       *  6/2001

* cited by examiner

*Primary Examiner*—Leslie A. Braun
*Assistant Examiner*—Tan Le
(74) *Attorney, Agent, or Firm*—Melvin A. Hunn

(57) ABSTRACT

The auger stand includes a vertical cavity (a "holding container") adapted to receive the auger, and to hold it in a substantially vertical position which facilitates the connection and disconnection to and from a tractor. When the auger is held upright in a vertical position, a single operator may connect the boom assembly and the drive shaft of the auger assembly to appropriate connections carried by the tractor. This can be done without lifting the weight of the auger as would be necessary if the auger is placed in a horizontal position when disconnected. After use, the auger may be disconnected from the tractor and maintained in an upright position, relieving the operator from the task of having to lower the auger to the ground.

8 Claims, 9 Drawing Sheets

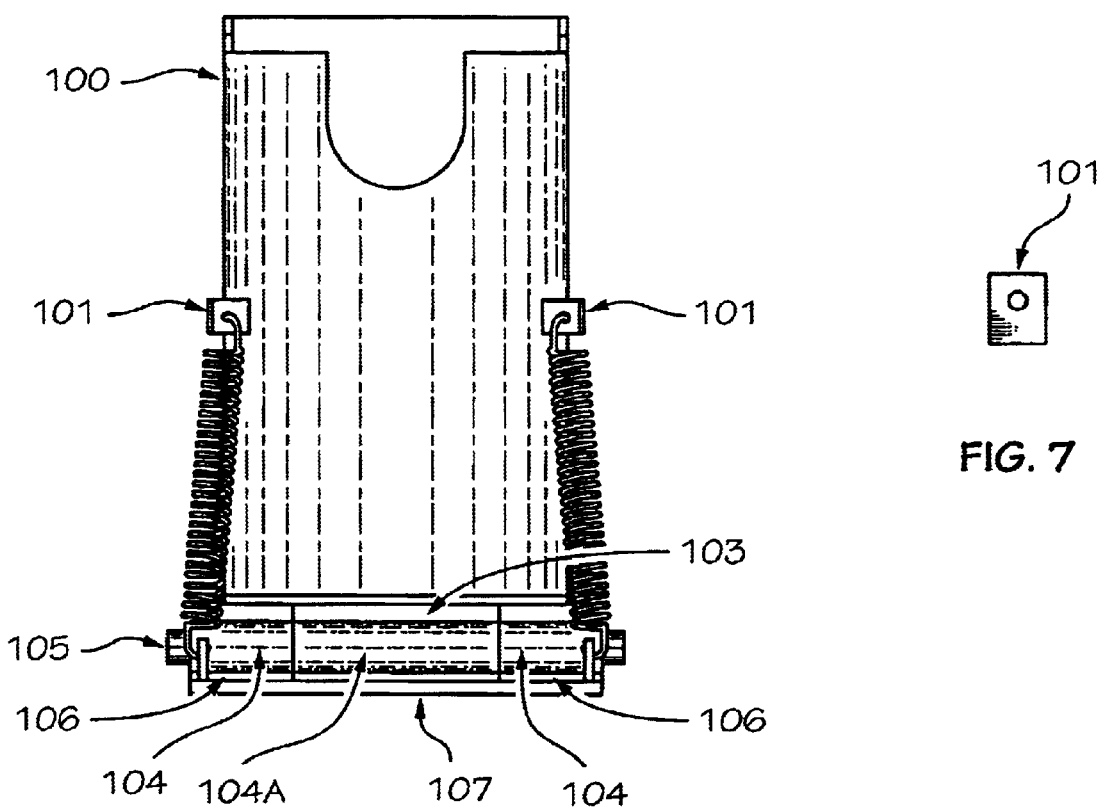
FIG. 5
FIG. 7
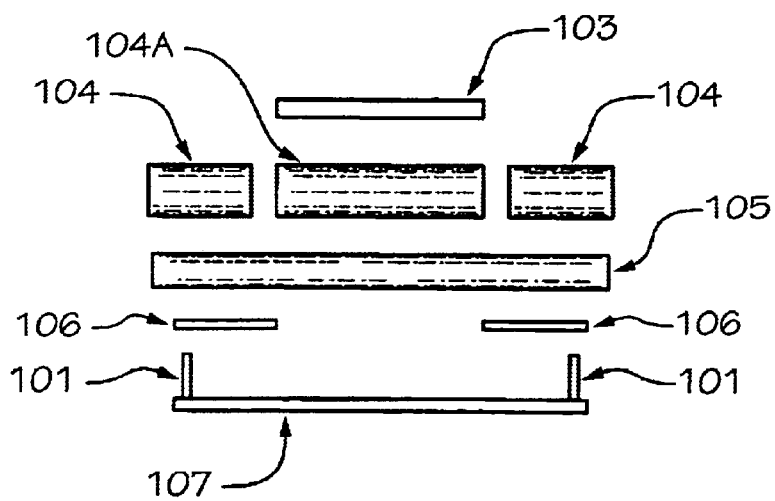
FIG. 6

AUGER AID HOLDING STAND

PRIORITY CLAIM

This application claims the benefit of U.S. Provisional Patent Application Serial No. 60/164,758, filed Nov. 12, 1999, entitled "Auger Aid Holding Stand."

BACKGROUND OF THE INVENTION

1. Field of the Invention

The present invention relates in general to auger stands which facilitate safe and quick connection and disconnection of an auger assembly to or from a tractor or other vehicle.

2. Description of the Prior Art

Augers are utilized in combination with tractors and other work vehicles in order to dig holes, such as post holes. Typically, an auger is quite heavy. For example, an auger might weigh in the range of 200–400 pounds (but it could be heavier or lighter). Typically, augers come in a variety of sizes. The larger sized augers are heavier than the smaller sized augers. For example, approximately 90% of the augers in use today are in the range of 8–9" in diameter. There are a smaller number of six inch diameter augers also in use. There are also a smaller number of 12" diameter augers in use.

Typically, an auger is connected to a tractor for two purposes. The first purpose is to physically suspend the auger in an upright position from the tractor. The second purpose is to allow a drive shaft to be connected between the auger and a tractor drive system. Typically, augers are connected to the back end of the tractor. There is a boom assembly which holds the auger in an upright position at the rear end of the tractor, and there is a drive shaft which allows the tractor drive system to turn the auger.

Connecting and disconnecting the auger to and from the tractor is a difficult task, due to the size and weight of the auger. Frequently, it is difficult for a single person to connect or disconnect the auger to and from the tractor.

SUMMARY OF THE INVENTION

The present invention is directed to an auger stand (called an "Auger Aid") which may be utilized to allow a single person to connect and/or disconnect an auger to and from a tractor.

The auger stand includes a vertical cavity (a "holding container") adapted to receive the auger, and to hold it in a substantially vertical position which facilitates the connection and disconnection to and from a tractor. When the auger is held upright in a vertical position, a single operator may connect the boom assembly and the drive shaft of the auger assembly to appropriate connections carried by the tractor. This can be done without lifting the weight of the auger as would be necessary if the auger is placed in a horizontal position when disconnected. After use, the auger may be disconnected from the tractor and maintained in an upright position, relieving the operator from the task of having to lower the auger to the ground.

Without the use of the auger stand of the present invention, operators are subjected to substantial risk of injury in raising or lowering the auger between horizontal and vertical positions, or due to the need to balance the auger while connecting it.

In use, the Auger Aid holds the auger in a vertical position in a manner which is safe and which is unlikely to tip or fall under most operating conditions as the Auger Aid.

The above as well as additional objectives, features, and advantages will become apparent in the following description.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of the preferred embodiment when read in conjunction with the accompanying drawings, wherein:

FIG. 5 is a front view of the embodiment of the present invention, of FIGS. 3 and 4, with the container coupled to a hinge assembly.

FIG. 6 is an exploded view of the hinge assembly of FIG. 5.

FIG. 7 is a view of a preferred clip in accordance with one embodiment of the present invention.

DETAILED DESCRIPTION OF THE INVENTION

Figure 1:
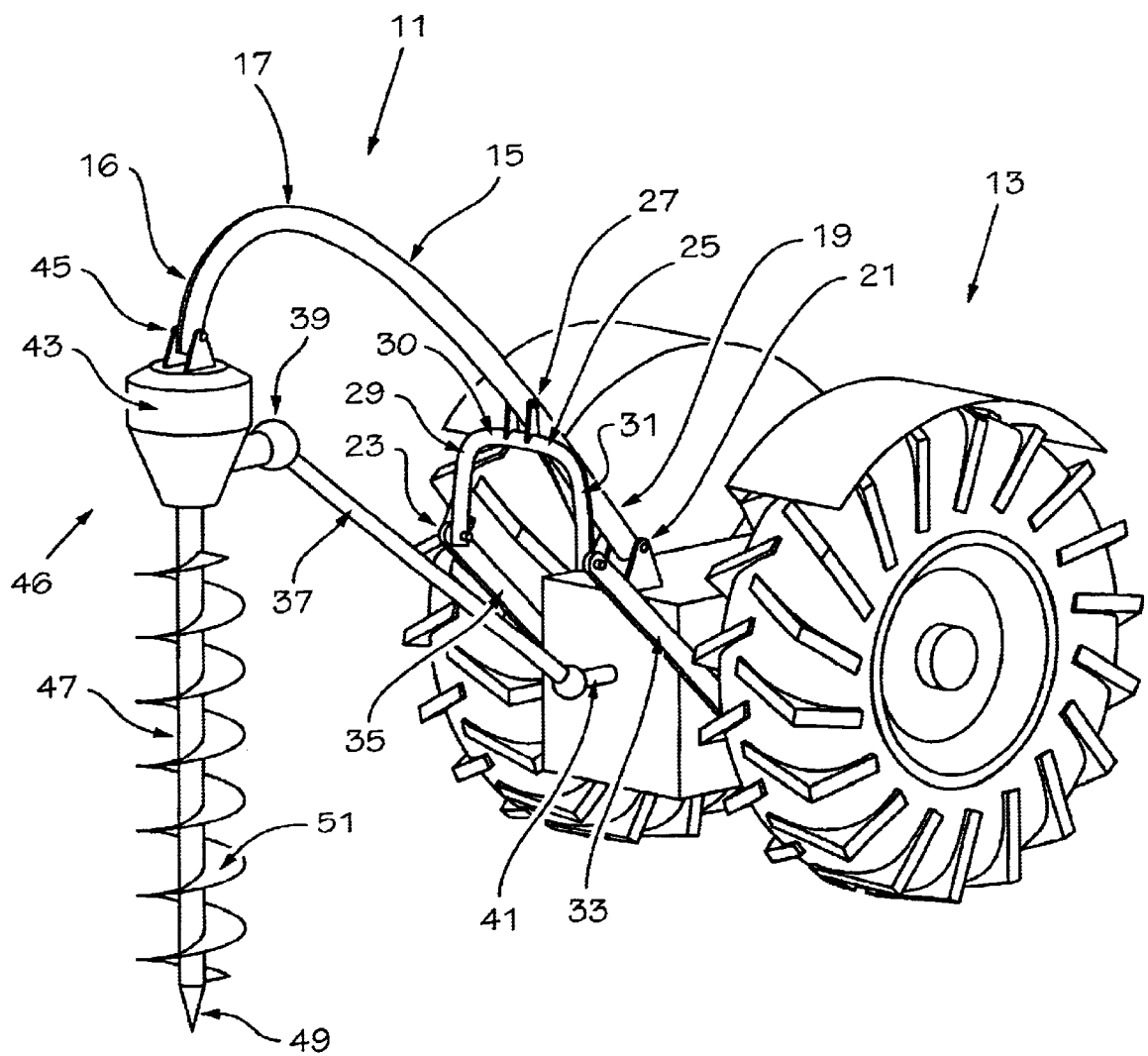
FIG. 1 is a simplified pictorial representation of an auger connected to a tractor.

FIG. 1 is a simplified pictorial representation of auger assembly 11 as coupled to tractor 13, with tractor 13 shown in a highly simplified and schematic form. As is shown, auger assembly 15 includes a boom 17 which includes an upper end 16 which is pivotally coupled to auger 46 and a lower end 19 which includes a pivotal coupling 21 to a rear portion of tractor 13. A yoke subassembly 25 is provided which includes parallel arms 29, 31 and a center portion 30 which extends between the parallel arms 29, 31 and which is pivotally connected at pin 27 to a middle portion of boom 17. The parallel arms 29, 31 are connected to flanges 33, 35 which are carried by tractor 13 (and which are shown schematically only).

Additionally, as is shown in FIG. 1, a drive shaft 37 is coupled between tractor 13 and auger 46. It includes a tractor coupling 41 which is adapted to connect to the power take-off of tractor 13 and a gear assembly 39 at the upper end of drive shaft 37 which is adapted to allow connection to gear box 43 which is carried at the upper end of auger 46. In this manner, torque may be provided from tractor 13 to auger 46. As is shown, auger 46 includes a central portion 47 which is surrounded by a helical blade 51 which terminates at tip 49. As auger 46 is rotated, helical blade 51 will bore into the earth and move material out of the hole.

Figure 2:
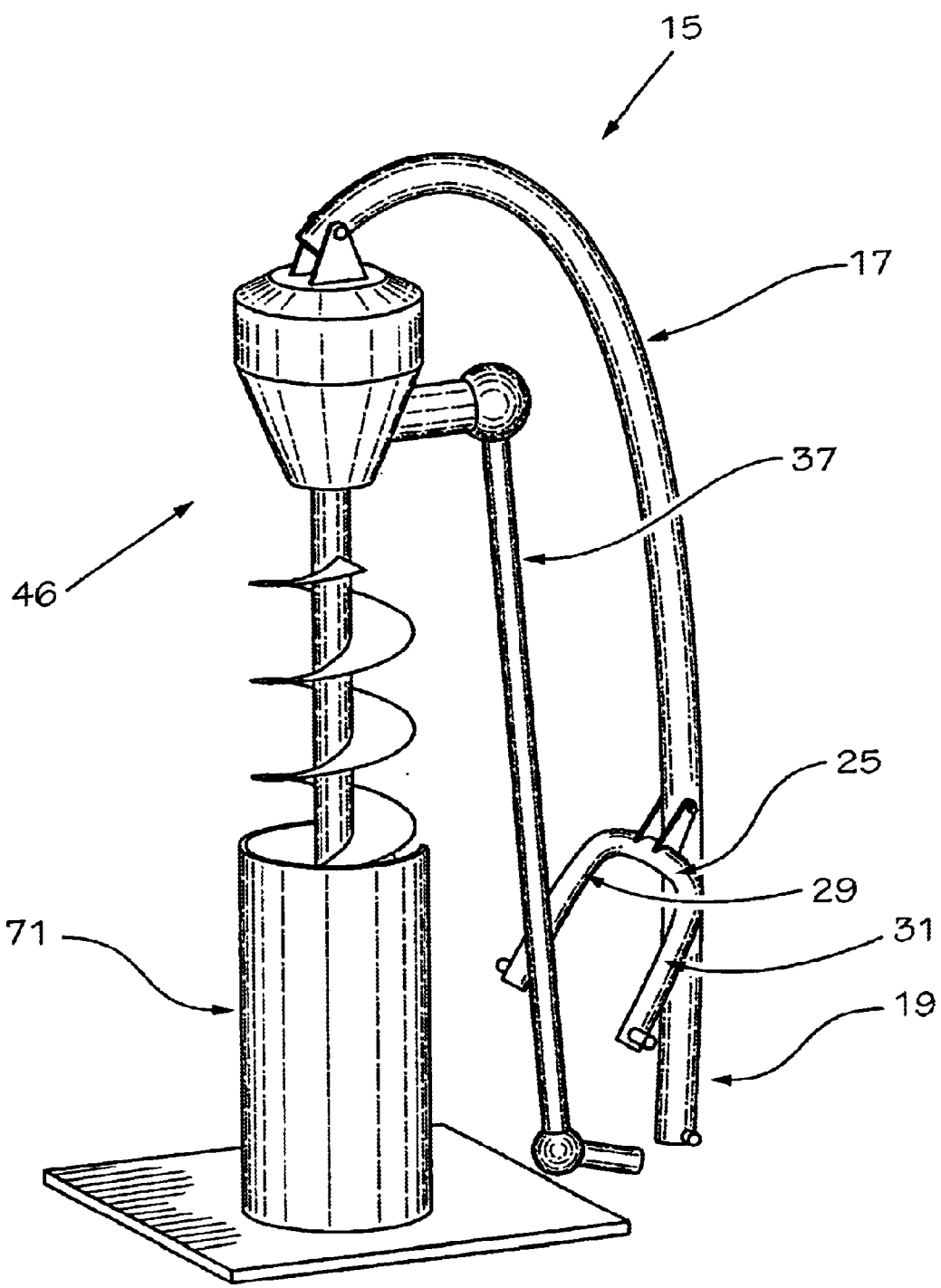
FIG. 2 is a simplified representation of an auger held in a vertical position when disconnected from the tractor of FIG. 1.

As is shown in FIG. 2, auger assembly 15 may be disconnected from tractor 13 and held in a vertical position relative to auger stand 71 which is shown in simplified form. In this configuration, the lower end 19 of boom 17 and the lower ends of parallel arms 29, 31 are in contact with the earth or shop floor. The auger itself is contained partially within auger stand 71 and extends outward from auger stand 71, in a substantially vertical position. When reconnection to the tractor 13 is desired, the lower end 19 of boom 17 is lifted and connected to the appropriate connection on tractor 13. Likewise, the lower ends of parallel arms 29, 31 are raised and connected to the appropriate connections carried by the tractor. Additionally, drive shaft 37 is connected to the power take off of tractor 13. This can be done by raising and position in these components. The amount of strength required to perform this task is substantially less than would be required if the auger 46 were in a horizontal positioning contact with the shop floor or earth's surface.

Several preferred embodiments of the auger stand of the present invention are depicted in FIGS. 3 through 17. In broad overview, the alternative embodiments relate to several different features or functions of the auger stand of the present invention.

One feature which is depicted in alternative embodiments is the container portion of the auger stand. In one embodiment, the container includes a relatively shallow cut away portion; but in an alternative embodiment, a rather deep cut away is provided. Alternative embodiments are also provided for the manner in which the container is hinged to a base portion. Other alternative embodiments are described which provide alternative base structures.

Figure 10:
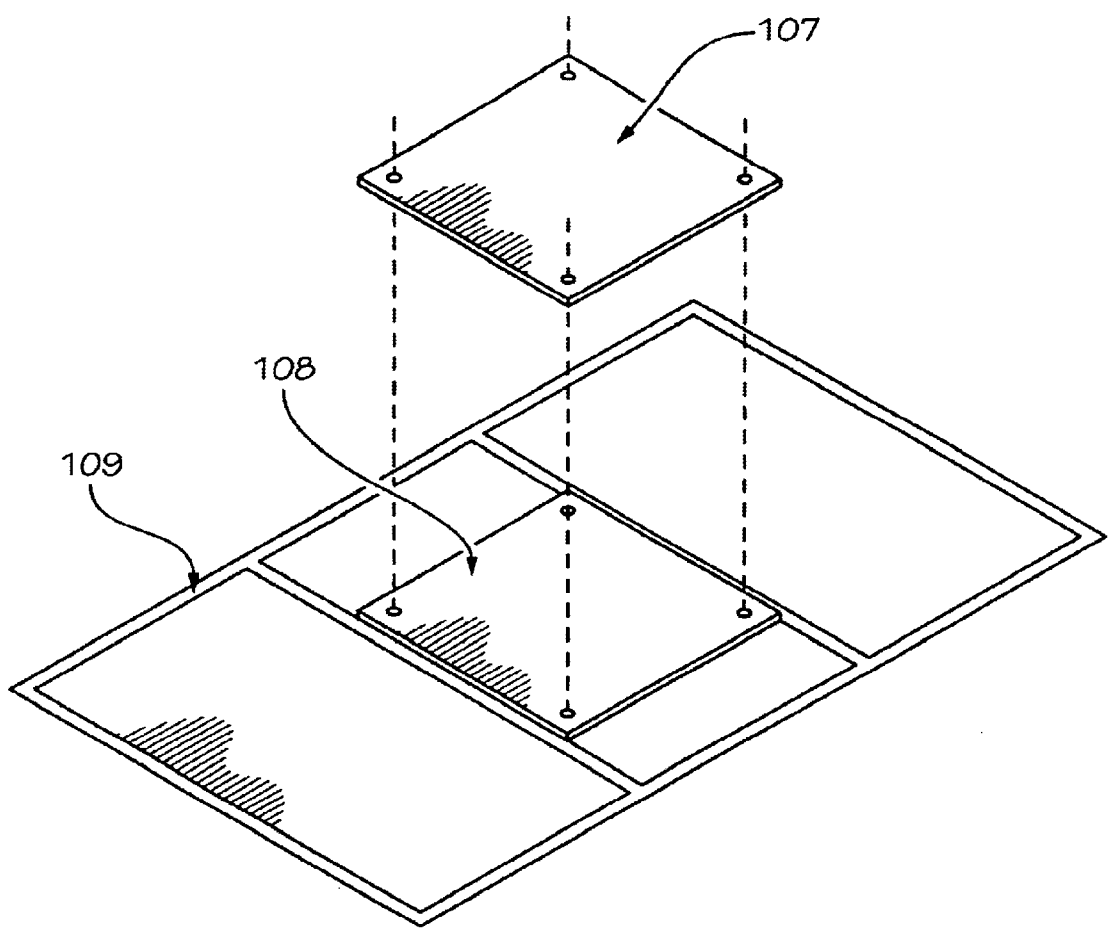
FIG. 10 is a pictorial representation of a movable stand which may be utilized with one embodiment of the present invention.
Figure 11:
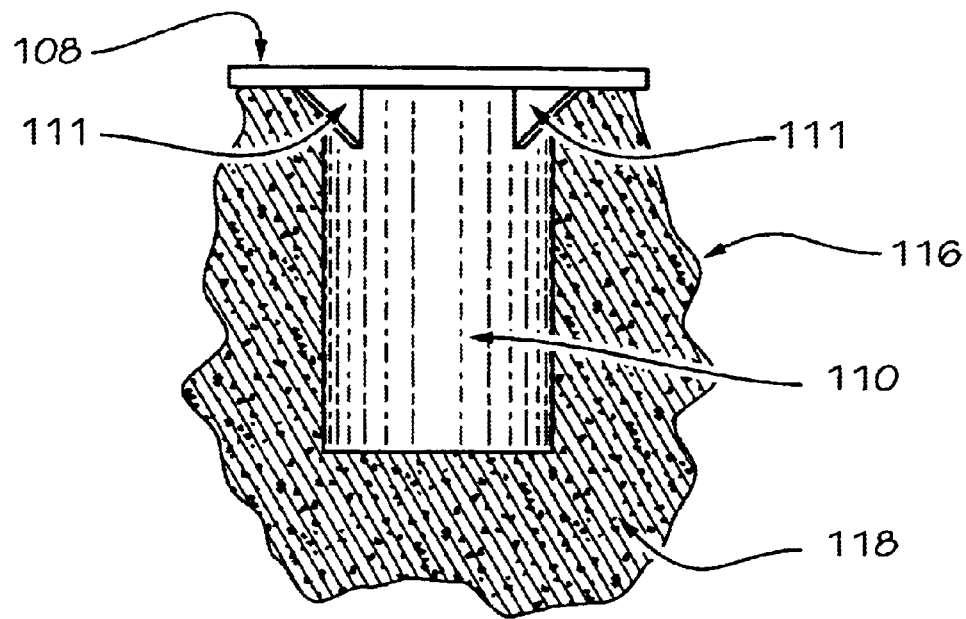
FIG. 11 is a pictorial representation of a stub post stand in accordance with an alternative embodiment of the present invention.
Figure 12:
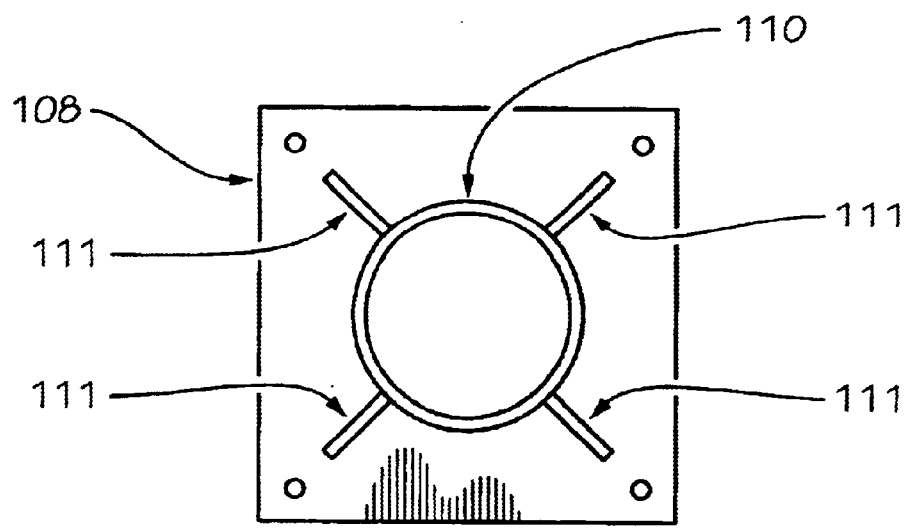
FIG. 12 is a bottom view of the stub post stand of FIG. 11.

In accordance with the present invention, holding container 100 is utilized as a stand for maintaining the auger in a vertical position to facilitate the connecting and disconnection of the auger from a tractor. This facilitates storing, hooking up, and removing the post hole augers. The holding container can be installed in a permanent location by attaching it to a cement floor or slab. Alternatively, the holding container can be bolted to a ground stub stand (which will be described later). The holding container is most versatile when mounted to a movable stand which provides the necessary base to support an auger in an upright position. This movable stand may be relatively easily moved about (by dragging it) to relocate the auger when it is not in use. Alternatively, the movable stand can be bolted to the bed of a work trailer and utilized to hold the auger in a vertical position when maintained on the trailer, thus allowing the auger to be moved about relatively easily. These alternative embodiments will be discussed below in greater detail. For example, FIG. 10 depicts a movable stand, while FIGS. 11 and 12 depict a ground stub stand alternative embodiment.

In the improved invention, a hinged bottom assembly for the holding container allows for a greater range of movement both during hooking up operations and disconnection operations. The holding container supports the weight of the auger so the operator need only lift the boom. This enables one person to move a post hold auger forward or backward as needed to attach or move it with less stain, and with much greater safety, and in much less time than can be accomplished using prior art systems.

Figure 13:
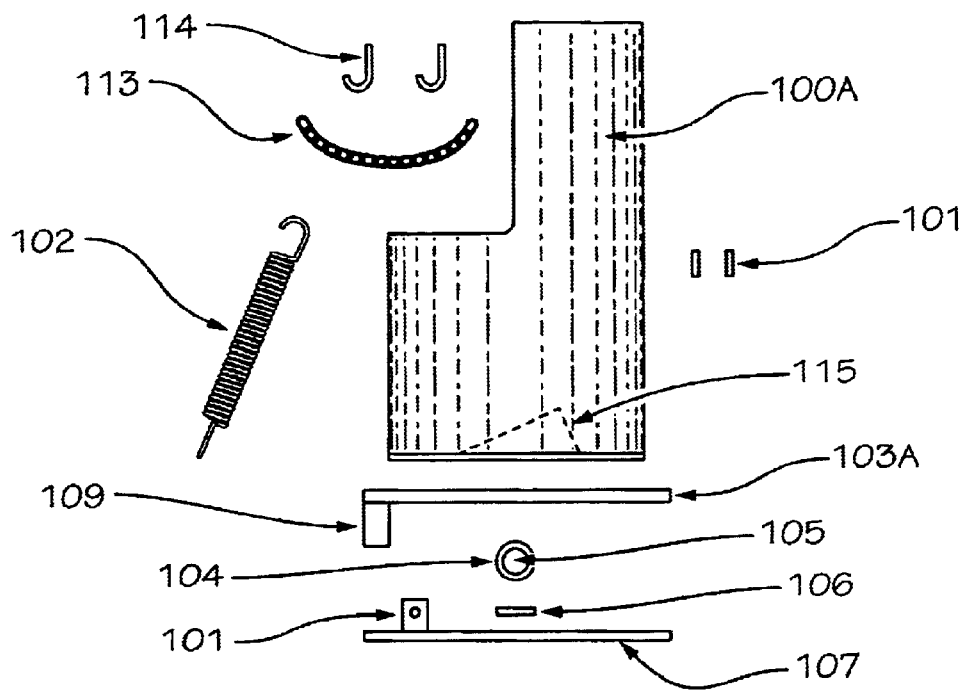
FIG. 13 is an exploded side view of a modified holding container with a hinge and spring assembly.
Figure 14:
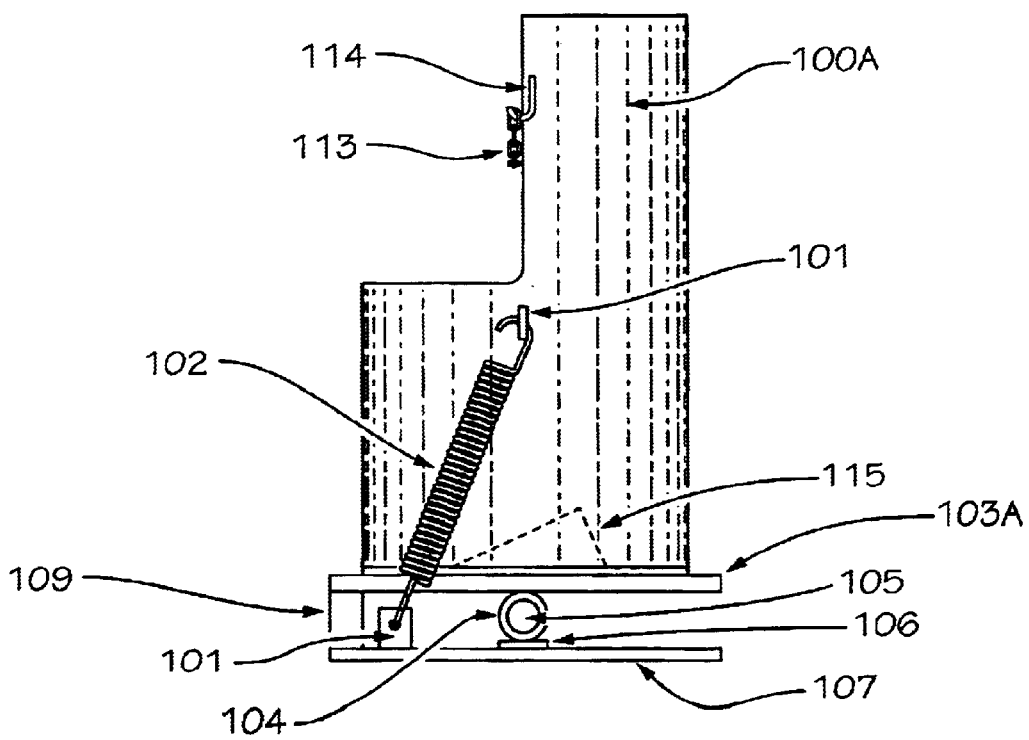
FIG. 14 is a side view showing an alternative cut away, safety chain, and point slide of the present invention with a spring and hinge assembly.
Figure 17:
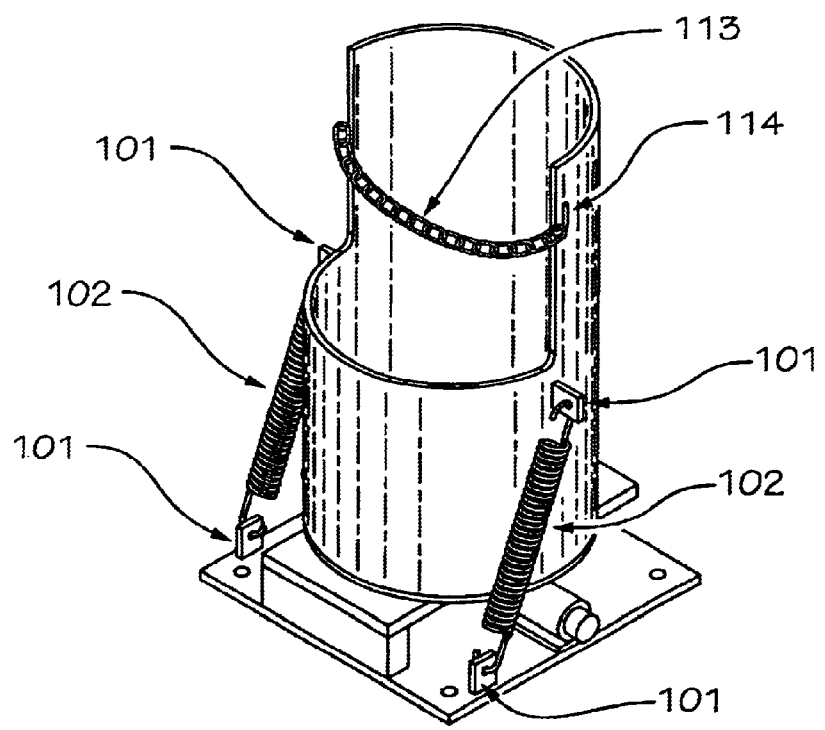
FIG. 17 is a front view of a safety chain and altered spring assembly.

Alternative embodiments are contemplated for the holding container 100. FIGS. 3, 4, 5, and 8 depict one embodiment which contains a relatively shallow cut away portion 90 on holding container 100. Alternatively, FIGS. 13, 14, and 17 depict an alternate embodiment with a much deeper cut away portion 92 on holding container 100. In either version, for durability and strength, steel is the preferred material used in construction of the auger stand of the present invention. As stated above, the shape of holding container 100 can vary considerably. However, in the preferred embodiment, a cylindrical holding container is preferred, with a cut away portion which may be v-shaped, box-shaped, or half-circle shaped. The cut away portions 90 at the top of holding container 100 are utilized to facilitate positioning of the auger tip relative to holding container 100. The cut away portion 90 allows the auger tip to be located or centralized within holding container 100. It functions like a "backboard." The non-cut away portions which surround the cut away serve to locate and secure the auger tip within the holding container 100. Thus, when the auger is lowered, it is centrally located within the holding container 100.

Figure 3:
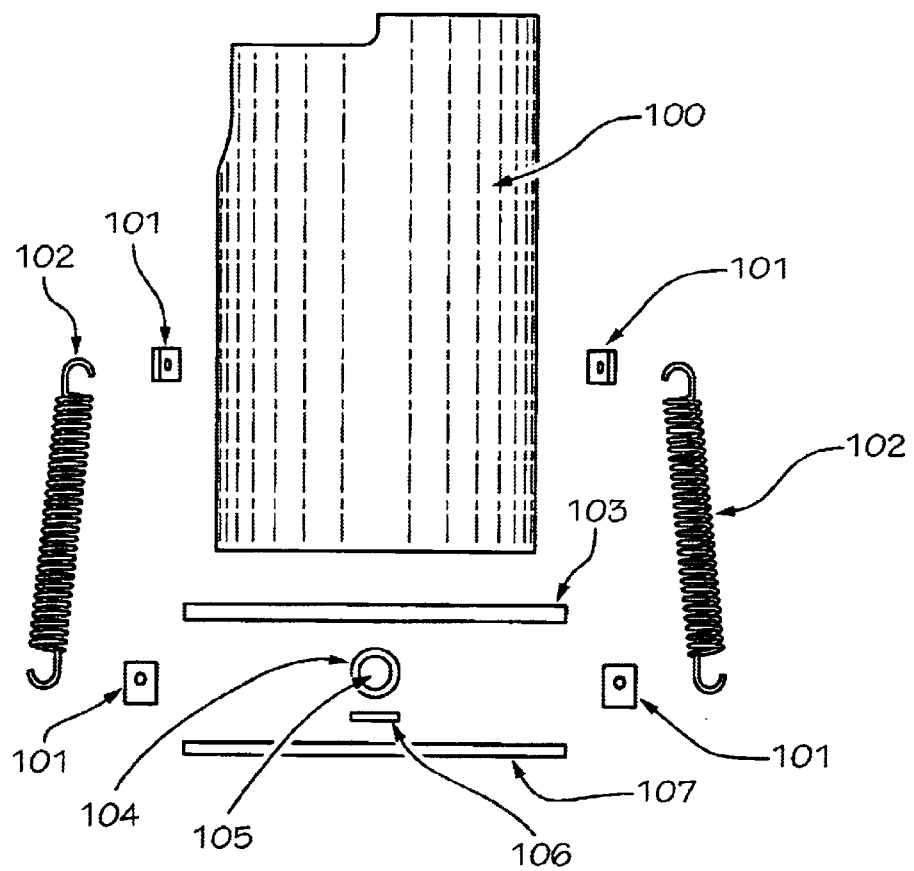
FIG. 3 is an exploded side view of a holding container in accordance with one embodiment of the present invention with one type of hinge and spring assembly.

With these points in mind, the embodiment of FIGS. 3–9 will now be discussed in detail. FIG. 3 depicts holding container 100 in an exploded view relative to the other components. As is shown, holding container 100 is positioned directly above a hinge assembly which includes hinge facing 103. Hinge facing 103 is positioned directly above a rod 105 which is surrounded by a collar 104. Shim 106 is positioned beneath collar 104 intermediate clips 101 which are carried by base plate 107. Clips 101 are also welded to holding container 100. Clips 101 include apertures which are adapted to receive the hook-ends of springs 102. Springs 102 (preferably four in this embodiment) operate to maintain holding container 100 in a relatively vertical position, while allowing some relative movement of holding container 100.

Figure 4:
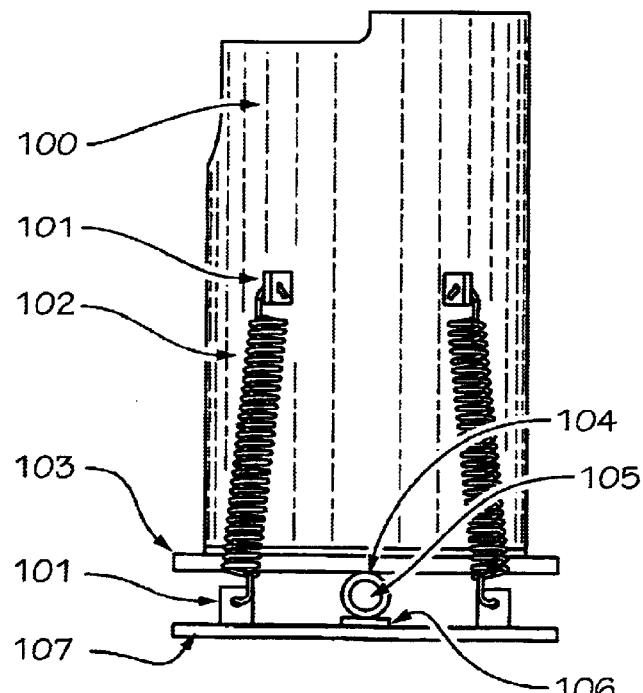
FIG. 4 is a side view showing the embodiment of the present invention of FIG. 3, with a cut away portion provided on the container, and with the spring and hinge assemblies attached to the container.

FIG. 4 depicts the components of FIG. 3 an assembled fashion. As is shown, the upper clips 101 are provided in an intermediate position on holding container 100 and are adapted to receive the hook-ends of springs 102. The lower clips 101 are welded or secured to base 107. A space provided between base plate 107 and hinge plate 103. The rod 105 and collar 104 are "sandwiched" between base plate 107 and hinge facing 103 with a shim 106 located between collar 104 and base plate 107. The springs 102 serve to hold holding container 100 in a relatively vertical position while allowing some pivotal movement forward or backward about rod 105 which is held in place by collar 104.

Figure 9:
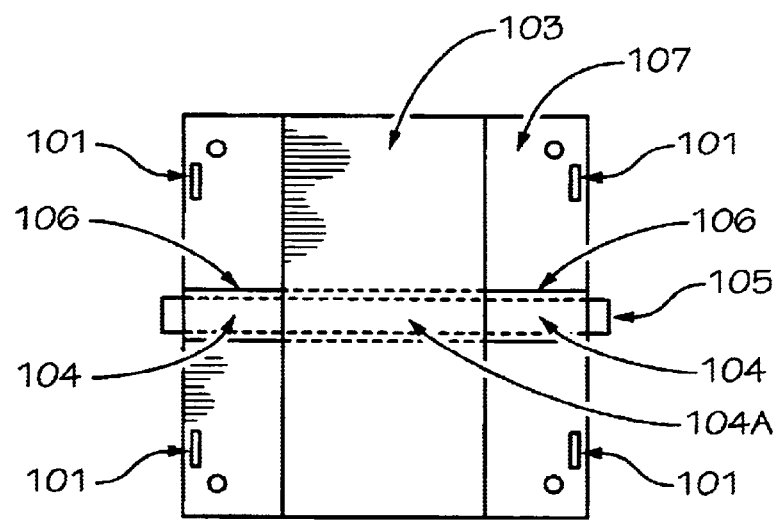
FIG. 9 is an alternative and exaggerated view of the spring assembly.

The hinge connection between hinge facing 103 and base plate 107 can be better understood with reference to FIGS. 5, 6, and 9. The hinge is similar to that found on doors, except that the collar portions 104 extend substantially continuously across hinge facing 103 and enclose most of rod 105. It is important to note that two of the collar members 104 are welded, or otherwise secured, to base plate 107, while one of the collar members 104 is welded or secured to hinge facing 103. Preferably, the collar member 104 which is secured to hinge facing 103 is in a "middle" position, as is depicted in FIG. 5. In order to assemble the auger stand of the present invention, the hinge facing 103 and base plate 107 must be brought into alignment, and the collar members 104 must also be aligned. Then, rod 105 is inserted through all three of the collar members 104. The view of FIG. 5 depicts the left and right collar members 104 as being secured to base plate 107, while the intermediate (or middle) collar member 104 is secured to hinge facing 103. Rod 105 is then inserted through all three of collar members 104.

FIG. 6 shows the hinge assembly of this embodiment in an exploded form. As is shown, hinge plate 106 is the uppermost component. Next, the three collar members 104 are provided. The center collar member is secured to hinge plate 103, while the leftmost and rightmost collar members 104 are secured to base plate 107. Rod 105 is inserted through all three of the collar members 104. Shims 106 are provided to raise the collar members 104 slightly off of base plate 107. This prevents dirt and other materials from being caught in the hinge assembly. As is shown, the base plate has secured to it (by weldment or otherwise) clips 101.

FIG. 9 provides yet an alternative depiction of the hinge assembly. This view is a view looking downward onto base plate 107. As is shown, tabs 101 are located approximately at the corner portions of base plate 107. Additionally, several bolt holes are provided in base plate 107 to allow it to be bolted to base structures which are depicted in FIGS. 10, 11, and 12. As is shown, hinge facing 103 is relatively small in size as compared to base plate 107. Also, as is shown in FIG. 9, shims 106 are disposed between collar members 104 and base plate 107. In this manner, the holding container 100 can move through a small arc defined by the space or "gap" between hinge facing 103 and base plate 107. In other words, the holding container 100 can tip forward and backward through this arc, only as allowed by the hinge defined by rod 105 and collar members 104.

Figure 8:
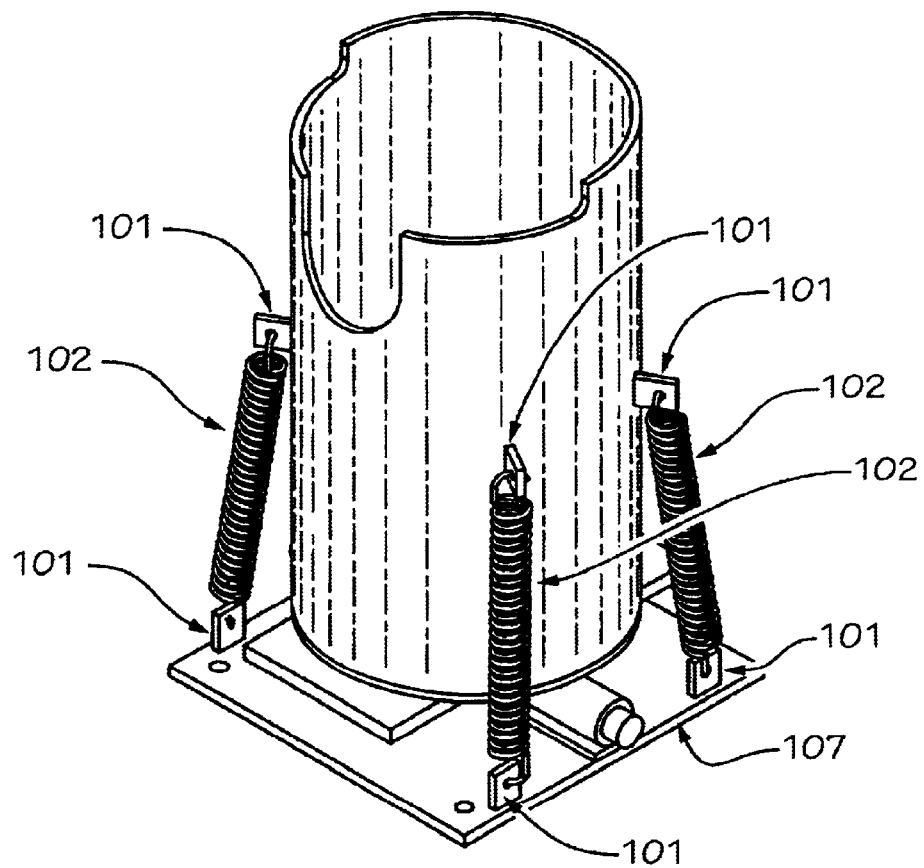
FIG. 8 is a top view of the base plate with the clips and hinge assembly in place.

FIG. 8 is a perspective view of the present invention, with holding container 101 centralized or stabilized in a vertical position by four spring members 102 which are connected between clips 101 which are carried on holding container 101 and clip members 101 which are secured or welded to base plate 107. The springs act to oppose one another and to generally stabilize holding container in an upper position, only while there is no auger maintained within holding container 100. Once the auger is located within holding container 100, it will tip forward or backward depending upon its relative position within holding container 100. However, this range of movement is limited by the hinge, and the amount of space maintained between the hinge facing 103 and the base plate 107.

FIG. 10 depicts one type of structure which may be utilized to secure and stabilize the auger aid of the present invention. As is shown, base plate 107 may be aligned with mounting plate 108 which is secured in position relative to a much larger and heavier movable stand 109. Base plate 107 may simply be bolted into position relative to mounting plate 108. The relatively heavy and broad movable stand 109 serves to provide a stable platform which will prevent tipping of the holding container 100 when the auger is placed within it. An alternative base structure is depicted in FIGS. 11 and 12. This structure is a ground stub 110 which may be cemented into a hole provided in a workshop floor or the earth's surface. This allows movable plate 103 to be much smaller in its overall size. A ground stub 110 is located within hole 116 and cemented in place by cement 118. FIG. 12 is a bottom plan view of mounting plate 108. As is shown, gussets 111 are provided (spaced apart 90 degrees from one another) in order to further stabilize the structure.

FIGS. 13 through 17 depict an alternative embodiment of the present invention which utilizes a much deeper cut away portion 92 in holding container 100, which utilizes only two springs (as opposed to four springs), and which includes a stop member which limits the amount of tilting which holding container 100A can experience during use. These features will be described first with reference to FIG. 13. FIG. 13 is an exploded view of the alternative embodiment. As is shown, holding container 100A has a much deeper cut away portion 92 than in the previous embodiment. This substantial cut away 92 causes a weight imbalance in holding container 100A which is compensated for in several respects. First, as is shown in FIGS. 13 and 14, a holding chain 13 is provided which may be utilized to secure the auger in position relative to holding container 100A and to prevent it from falling out of holding container 100A through the cut away portion 92. Additionally, in order to shift the weight of the auger to the portion of holding container 100A which serves as a backstop 94, there is a point slide 115 which is an angled bottom portion within holding container 100A which angles the auger into contact with the upper (backstop) portion 94 of holding container 100A and away from chain 113. As is shown in FIG. 13, the bottom portion of holding container 100A is secured to hinge facing 103A which is similar to the hinge facing 103 of the prior embodiment, but which is modified to include a stop member 109 which prevents tilting of holding container 100A in the direction of the cut away 92 (and safety chain 113). In operation, stop 109 will come into engagement with base plate 107 to allow tilting in only one direction, namely backward away from the cut away portion 92 of holding container 100A. FIG. 13 also shows a shim 106 which is provided between collar member 104 and rod 105, all constructed in a manner similar to the previous embodiment.

FIG. 14 shows the present invention in non-exploded view. As is shown, holding container 100A includes a substantial cut away portion 92, thus providing a substantial backstop portion 94. As is shown, a safety chain 113 is provided in order to enhance the safety of the device. As is shown, holding container 100A is secured to hinge facing 103 which is coupled through the hinge assembly of collars 104, rod 105, and shim 106 to base plate 107. As is shown, stop member 109 will engage base plate 107 and prevent the forward tilting of holding container 100A, but which will not prevent the backward tilting of holding container 100A. Accordingly, holding container 100A may tilt through an arc of movement from a fully upright position to a slightly-backward-tilted position. All as is permitted by the space between hinge facing 103A and base plate 107, but also by the size of shim 106, collar members 104, and rod 105.

Figure 15:
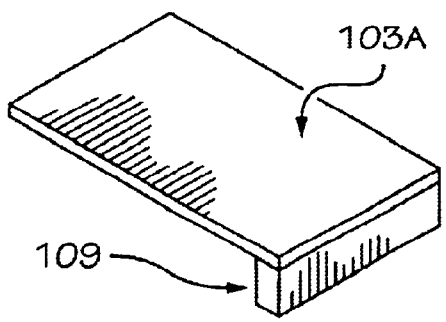
FIG. 15 is a top view of the modified hinge facing.
Figure 16:
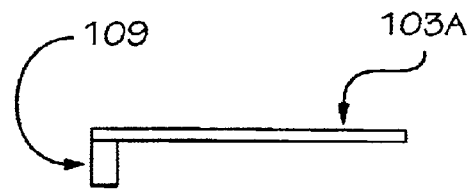
FIG. 16 is a side view of a modified hinge facing.

FIGS. 15 and 16 depict facing plate 103A with stop member 109. FIG. 17 depicts the second embodiment of the present invention in a perspective view. Only two springs 102 are provided and coupled between clip members 101. This biases the holding container 100A into its upright fully vertical position. Of course, springs 102 are not strong enough to have any effect on holding container 100A when an auger is placed therein, so they serve only to maintain holding container 100A in an upright position when no auger is contained therein. When an auger is placed within holding container 100A, the point slide 115 of holding container 100A will urge the tip of the auger forward and the top of the auger backward; this will apply force against the backstop portion of holding container 100A, and will tilt the holding container 100A backward through its arc until facing plate 103A comes into contact with base plate 107.

The following is a brief description of the parts necessary to manufacture the first embodiment of the auger aid described herein:

(1) the base plate 107 is preferably constructed from a steel plate which is ⅜" thick and which is square in shape, preferably measuring 12"×12". Four holes are drilled into this plate to allow mounting of base plate 107 to either movable stand 109 or ground stub 110.

(2) The hinge facing 103 is preferably constructed from a steel plate which is ½" thick, which is preferably rectangular in shape measuring 6"×12".

(3) In the preferred embodiment, rod 105 is constructed from a 1" diameter steel rod which is preferably 13¼" long, and which further has two holes drilled at each end, with each hole being 3/16" in diameter.

(4) The collar members 104 are formed utilizing pipe collars. Two of the pipe collars (the leftmost and rightmost collars) are 1"×3" long. The center collar member 104 is preferably 1"×6" long.

(5) The shims 106 are preferably shim plates which are 1½" wide by 3" long. Preferably, these shim plates are ¼" thick.

(6) The clip members 101 are preferably rectangular steel members which are 1¼"×1"×¼" thick, with holes formed therein which are slightly off center and which have a diameter of 5/16".

(7) Preferably springs 102 are 1" diameter springs which are 8½" long, with approximately 25–35 pounds of pull.

(8) Cotter pins are provided in order to fill the holes formed in rod 105 and to keep rod 105 in position.

(9) The holding container 100 is preferably formed from 10" diameter pipe (for an 8" or 9" auger, or 14" pipe for a 12" auger, or 8" pipe for a 6"0 auger) which is 17" long, and which has a ¼" wall thickness, and with a cut away portion which is approximately 4" of cut away. In the alternative embodiment, the cut away is approximately twice as long.

(10) Together, these components provide for a holding container which may be pivoted backward and forward approximately 10 degrees. The following is a description of the individual manufacturing steps required to manufacture the first embodiment described herein.

Parts Required for Assembly

1 Plate 12"×12"×⅜" thick 4 hole
1 Plate 6"×12"×½ thick
1 Pipe 10" diameter 17" long ¼" wall thick
1 Rod 1" diameter 13¼" long with 2 3/16" hole
2 Pipe collars 1"×3" long
1 Pipe collar 1"×6" long
2 Shim plates 1½"×3" long×¼" thick
8 Clip 1¼"×1"×¼" with 5/16" hole off center
4 Springs 1"×8½" long with approximate 25 Lbs–35 Lbs pull
2 Cotter keys to fit 3/16" hole

Assembled Version

Side View

Approximately 10° swivel forward
Approximately 10° swivel back
Pipe 10" diameter 17" long ¼" wall thick
Spring 1"×8½" long with approximate 25 Lb–35 Lb pull
6"×12"×½" thick
Plate 12"×12"×⅜" thick 4 hole
Pipe collar 1"×3" long
Shim plate 1½" wide×3" long×¼" thick
Rod 13¼" long with 2 3/16" holes ¼" from end
Cotter pin
1¼"×1"×¼" with 5/16" hole off center

Assembled Version of Base Plate Less Clips

Rear View Front View

This diagram is of base plate with hinge assembly on it. The base plate is 12"×12"×⅜" thick, this plate has 4 holes 1 in each of its corners. Center of hole to edge of plate is 1".

This plate also has 2 shim plates welded to it, these shims are 1½" wide 3" long and ¼" thick. They are placed in the center of 2 outside opposite edges. They are added to provide clearance for the 1"×6" pipe collar to work freely. On top of these shims 2 1"×3" pipe collars are welded parallel with the shims. Allowing the 1"×13¼" rod to pass through both collars. The rod will extend out on both side of the plate enough to allow 2 cotter pins to be inserted.

Pipe collar 1"×6" long
Clearance
Plate 6"×12"×½" thick
Pipe collar 1"×3"
Shim 1½"×3"×¼"
Plate 12"×12"×⅜" thick 4 hole
Shim plate 1½" wide×3" long
Rod 1"×13¼" long with 2 3/16 holes ¼" from end
Pipe collar 1"×3" long

Base Plate with Clips

Top View

This diagram is of base plate to show the position of the 4 spring clips
⅝" Hole
Spring clip 1¼" tall 1" wide ¼" thick 5/16" hole
This clip is placed 1/32" from outside edge and 1¼" from vertical edge

Side View

1¼"
⅜" thick

Pipe Auger Holding Assembly with 6"×12" Plate and 1"×6" Long Pipe Collar Positions

Front View

The 10" pipe is cut as shown this allows the point on the auger to pass through.
The 6"×12"×½ plate is then welded on the 10" pipe as shown in the top view.
The 1"×6" pipe collar is then welded on the 6"×12"×½ plate as shown in both side view and front view.
Cut 4"
Plate 6"×12"×½ thick
Pipe collar 1"×6" long
Pipe 10" Diameter 17" long-tall ¼" wall thick

Side View

Weld
1"×6" pipe collar
6"×12"×½" thick

Top View

Plate 6"×12"×½ thick
Pipe 10" diameter 17" long-tall

Pipe Anger Holding Assembly with Spring Clips Positions

Right Side View

Clips 1"×1¼" ⁵⁄₁₆" hole
These clips are welded on with the hole extended out
10" pipe
6"×12"×½" plate
1"×6" pipe collar

Left Side View

10" pipe
6"×12"×½" plate
1"×6" pipe collar

Anchor Mounts for Auger Aid Holding Stand

Cement Floor Slab Type

The Auger Aid Holding Stand has a mounting plate designed like this plate ⅜" thick
The holes are 10" center to center apart
Note: If mounting The Auger Aid Holding Stand on a cement floor or slab type mount a sufficient size and length anchor bolt should be used to support Auger. Also a sufficient size slab should be used.

Anchor-Mounts for Auger Aid Holding Stand

Moveable Frame Type

Side View

2" 11 Ga tube

Top View

Corners cut 45°
This plate is 12"×12"×⅜" thick
1" edge to center of hole
This type of mount is designed to be movable when needed and should be placed on a firm level surface. The Auger Aid Holding Stand will mount to the top with 4 corresponding holes, using 4½"×2" bolts, nuts, washers.
Note: Grade 5 bolts nuts or better grade should be used.

Anchor-Mounts for Auger Aid Holding Stand

Ground Stub Type

Side View

⅜" thick plate
Gussets made out of 3"×3"×¼"
4½"×¼" thick pipe

Top View

⅝" diameter
1" edge to center of hole

Bottom View

Gussets
4½"
This type of mount is designed to be cemented in the ground with the top being set level. The top should not exceed 2" above ground level. The Auger Aid Holding Stand will mount to the top with 4 corresponding holes, using 4½"×2" bolts, nuts, washers.
Note: Grade 5 bolts, nuts or better grade should be used.

Although the invention has been described with reference to a particular embodiment, this description is not meant to be construed in a limiting sense. Various modifications of the disclosed embodiments as well as alternative embodiments of the invention will become apparent to persons skilled in the art upon reference to the description of the invention. It is therefore contemplated that the appended claims will cover any such modifications or embodiments that fall within the scope of the invention.

What is claimed is:

1. An auger stand comprising:

a base plate;

an auger holding container hingedly coupled to the base plate the auger holding container having side walls and a bottom plate, the side walls having a cut away portion and an opposing backstop portion; and at least one spring for biasing the auger holding container in an upright position; and wherein the cut away portion is disposed on a front side of the auger holding container, the backstop portion is located on a back side of the auger holding container, and the hinge is disposed such that the auger holding container tilts generally in a direction from the front side to the back side, and vice versa.

2. The auger stand according to claim 1, further comprising:

a base support member adapted to be releasably coupled to the base plate.

3. The auger stand according to claim 2, wherein the base support member is a generally planar frame assembly.

4. The auger stand according to claim 2, wherein the base support member comprises:

an elongated stub adapted to be installed below ground level; and an upper plate coupled to the elongated stub, the upper plate being adapted to be releasably coupled to the base plate.

5. An auger stand comprising:

a base plate;

an auger holding container hingedly coupled to the base plate, the auger holding container having side walls and a bottom plate, the side walls having a cut away portion and an opposing backstop portion;

at least one spring for biasing the auger holding container in an upright position; and a safety chain adjustably coupled to the auger holding container, the safety chain being disposed so as to extend across the cut away portion.

6. An auger stand comprising:

a base plate;

an auger holding container hingedly coupled to the base plate, the auger holding container having side walls and a bottom plate, the side walls having a cut away portion and an opposing backstop portion;

at least one spring for biasing the auger holding container in an upright position; and an inclined slide disposed within the auger holding container for biasing an auger against the backstop portion.

7. An auger stand comprising:

a base plate;

an auger holding container hingedly coupled to the base plate, the auger holding container having side walls and a bottom plate, the side walls having a cut away portion and an opposing backstop portion;

at least one spring for biasing the auger holding container in an upright position; and a stop coupled to the auger holding container for limiting the forward tilt of the auger holding container relative to the base plate.

8. The auger stand according to claim 7, wherein the at least one spring biases the auger holding container in an upright position such that the stop engages the base plate.

* * * * *